(12) United States Patent
Kang et al.

(10) Patent No.: US 8,203,467 B2
(45) Date of Patent: Jun. 19, 2012

(54) APPARATUS, METHOD, AND MEDIUM FOR EXPANDING NUMBER OF INPUT CHANNELS

(75) Inventors: Kyoung-ho Kang, Yongin-si (KR); Seong-il Cho, Seoul (KR); Wook Chang, Seoul (KR); Byung-seok Soh, Suwon-si (KR); Yeun-bae Kim, Seongnam-si (KR); Joon-ah Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1411 days.

(21) Appl. No.: 11/808,414

(22) Filed: Jun. 8, 2007

(65) Prior Publication Data

US 2007/0287434 A1 Dec. 13, 2007

(30) Foreign Application Priority Data

Jun. 9, 2006 (KR) .................. 10-2006-0052222

(51) Int. Cl.
*H03K 17/94* (2006.01)
(52) U.S. Cl. ............. 341/22; 379/368; 200/5 A; 400/487
(58) Field of Classification Search ............... 341/22; 379/368; 200/5 A; 400/487
See application file for complete search history.

(56) References Cited

U.S. PATENT DOCUMENTS 4,555,193 A * 11/1985 Stone ........................ 400/486
5,808,567 A * 9/1998 McCloud ..................... 341/20
2007/0133788 A1 * 6/2007 Ladouceur et al. ...... 379/433.07

FOREIGN PATENT DOCUMENTS

| JP | 08-328798 | 12/1996 |
| JP | 09-062451 | 3/1997 |
| JP | 09-325859 | 12/1997 |
| JP | 2000-222130 | 8/2000 |
| JP | 2001-184167 | 7/2001 |
| KR | 10-2005-0043541 | 5/2005 |

OTHER PUBLICATIONS

Japanese Office Action dated Jan. 26, 2010, issued in corresponding Japanese Patent Application No. 2007-148231.

* cited by examiner

*Primary Examiner* — Timothy Edwards, Jr.
(74) *Attorney, Agent, or Firm* — Staas & Halsey LLP

(57) ABSTRACT

Provided are an apparatus, method, and medium for expanding the number of input channels, more particularly, an apparatus and method for expanding the number of input channels, which can expand the number of input channels using a limited number of input code values. The apparatus includes a first input unit, a second input unit, and a control unit. The first input unit has a plurality of buttons arranged therein, the buttons each being assigned a predetermined input code value. The second input unit is formed on one side of the first input unit and has a plurality of buttons arranged therein, the buttons each being assigned a predetermined input code value and each being formed to be adjacent to neighboring buttons of the first input unit. The control unit performs predetermined functions depending on a combination of buttons manipulated in the first input unit and the second input unit.

13 Claims, 11 Drawing Sheets

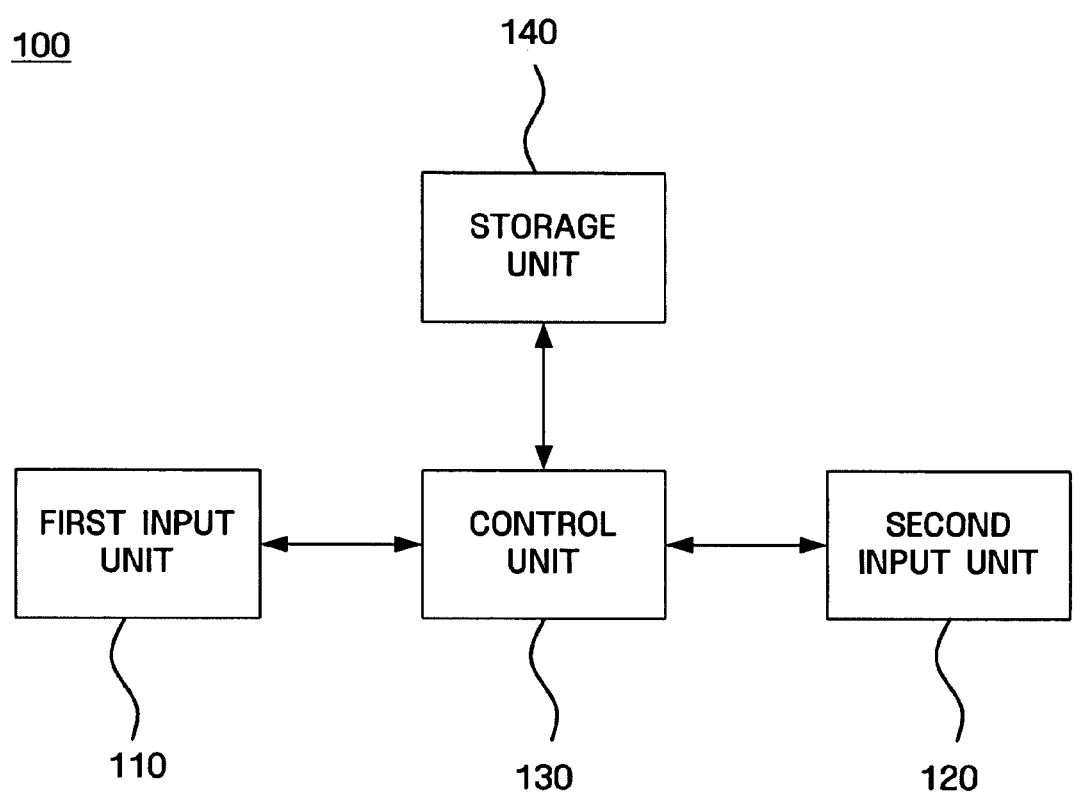

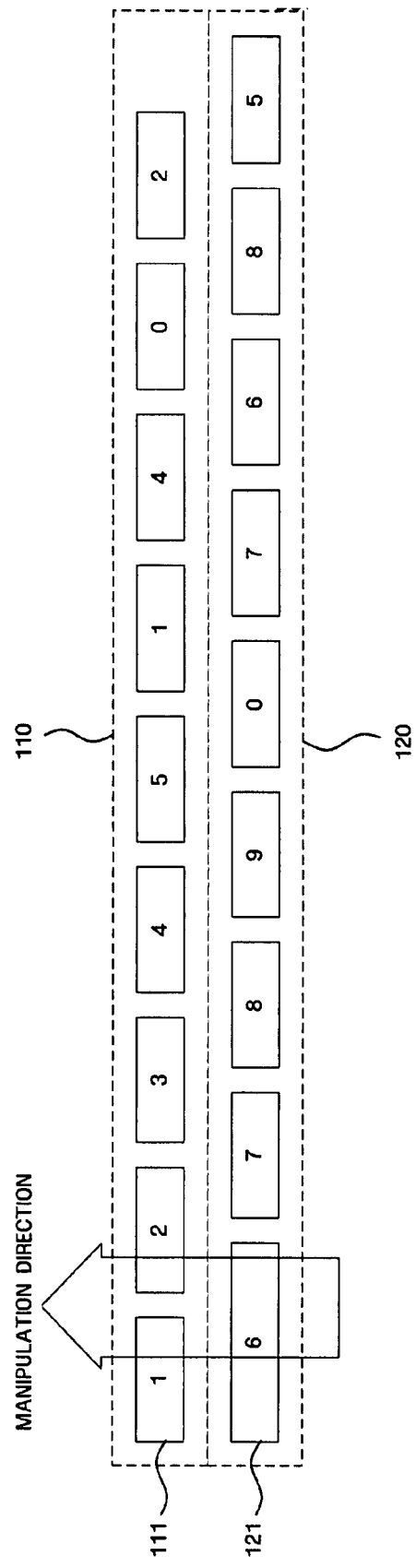
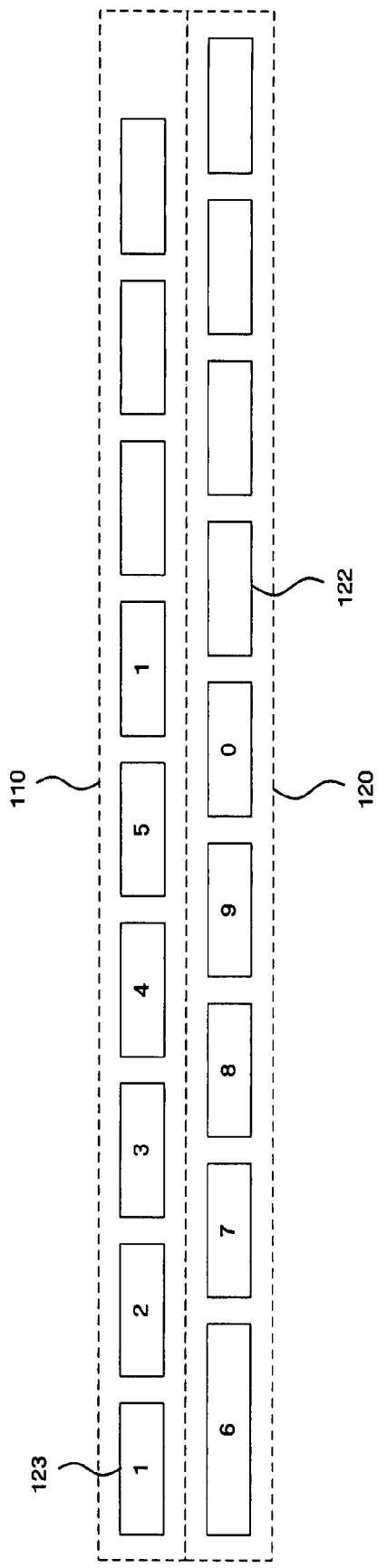

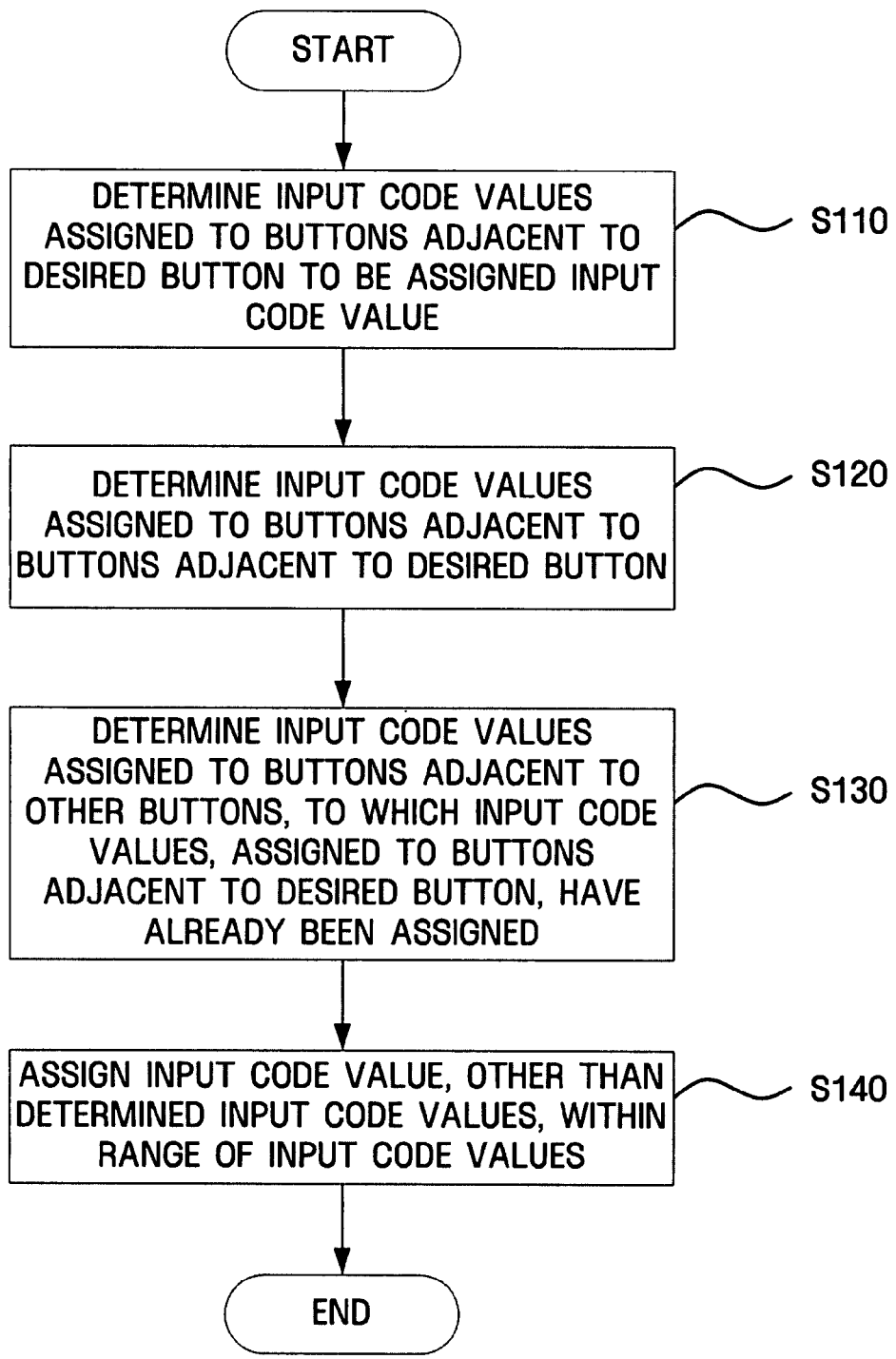

APPARATUS, METHOD, AND MEDIUM FOR EXPANDING NUMBER OF INPUT CHANNELS

CROSS-REFERENCE TO RELATED APPLICATIONS

This application claims the priority benefit of Korean Patent Application No. 10-2006-0052222 filed on Jun. 9, 2006 in the Korean Intellectual Property Office, the disclosure of which is incorporated herein by reference in its entirety.

BACKGROUND OF THE INVENTION

1. Field of the Invention

The present invention relates to an apparatus, method, and medium for expanding the number of input channels and, more particularly, to an apparatus, method, and medium for expanding the number of input channels, which can expand the number of input channels through a limited number of input code values.

2. Description of the Related Art

Generally, a keypad having a predetermined number of keys is formed on a mobile phone, a Personal Digital Assistant (PDA), etc. A user can select a desired menu item by pressing the keypad, and can use content corresponding to the selected menu item. For example, the user calls a menu item required to select the type of content, such as images, music, and photographs, using a predetermined keypad, and selects and uses various types of content included in the corresponding menu item.

In this case, when the number of content items that can be selected by the user is large, the user looks through all content items using a scroll function, and then selects desired content. Further, in order for the user to use a scroll function, there is an inconvenience in that a key on the keypad must be repeatedly pressed. Therefore, recently, a touch pad has been installed in a mobile phone or PDA, thus allowing the user to easily use the scroll function.

FIG. 1 is a diagram showing a conventional device on which a touch pad is installed.

As shown in FIG. 1, a conventional device 10 on which a touch pad is installed includes a touch pad 11, including a plurality of touch buttons, and a display unit 12 for displaying a picture or an image in response to the manipulation of the touch pad 11.

In this case, the touch pad 11 includes a plurality of touch buttons to which predetermined input code values are respectively assigned. As the input code values assigned to respective touch buttons, input code values supported by a chipset performing the function of the touch pad 11 can be assigned. FIG. 1 illustrates an example of the case where the chipset supports input code values from 0 to 9 as the input code values. In the touch pad 11, each of the touch buttons to which an input code value from 0 to 9 has been assigned can be understood to be a single input channel. Therefore, the number of input code values supported by the chipset may be understood to be the number of input channels.

Such a touch pad 11 is configured so that the touch buttons, assigned input code values of 1 to 9, are arranged on the outer portion of the touch pad 11, and a touch button, assigned an input code value of 0, is arranged on the inner portion of the touch pad. In this case, the touch button, assigned the input code value of 0, is a common button, and is used to perform operations, such as drag-in and drag-out operations, together with the touch buttons assigned the input code values of 1 to 9.

For example, as shown in FIG. 2A, if touch buttons are sequentially manipulated in the order of one of the touch buttons assigned the input code values of 1 to 9, and the touch button assigned the input code value of 0, the current operation is recognized as a drag-in operation. As shown in FIG. 2B, if touch buttons are sequentially manipulated in the order of the touch button assigned the input code value of 0, and one of the touch buttons assigned to the input code values of 1 to 9, the current operation is recognized as a drag-out operation.

Further, the touch buttons assigned the input code values of 1 to 9 are provided with different functions. Therefore, if a drag-in operation is performed using the touch button assigned the input code value of 1, an image menu is displayed on the display unit 12. Further, if a drag-in operation is performed through the touch button assigned the input code value of 2, a music menu is displayed on the display unit 12.

However, if a drag-in operation is simultaneously performed using two touch buttons among the plurality of touch buttons assigned the input code values of 1 to 9, due to the user's carelessness, an error related to selection of a function to be performed from among the functions assigned to the two touch buttons may occur, thus causing an erroneous operation.

For example, as shown in FIGS. 3A and 3B, when two touch buttons among the touch buttons assigned input code values from 1 to 9 are simultaneously manipulated during a drag-in operation or a drag-out operation, an erroneous operation may occur.

Further, when the functionality of the device 10 using the touch buttons 11 is intended to be increased, the number of input channels increases, and thus an additional chip must be mounted to expand the number of input channels. As a result, there is a problem in that additional costs are incurred, thus increasing the cost of products.

Japanese Patent Publication No. 2000-222130 discloses a method of enabling simultaneous selection of a plurality of objects, such as icons, using one hand by simultaneously bringing several fingers into contact with a touch panel screen and by utilizing a trace pattern as a gesture, or of executing designated programs through a drag and drop operation on the icon of programs designated according to the sequence of contact. However, Japanese Patent Publication No. 2000-222130 does not propose a method of preventing an erroneous operation occurring when a plurality of touch buttons is manipulated, or a method of expanding the limited number of input channels.

SUMMARY OF THE INVENTION

Accordingly, the present invention has been made keeping in mind the above problems occurring in the prior art, and the present invention provides an apparatus, method, and medium for expanding the number of input channels, which can prevent an erroneous operation occurring when a plurality of touch buttons is simultaneously manipulated, and can expand the number of input channels using a limited number of input code values.

In accordance with an aspect of the present invention, there is provided an apparatus for expanding a number of input channels, the apparatus including a first input unit which includes a first plurality of buttons arranged therein, each of the first plurality of buttons being assigned a predetermined input code value, a second input unit which is formed on one side of the first input unit and which includes a second plurality of buttons arranged therein, each of the second plurality of buttons being assigned predetermined input code value and each being formed to be adjacent to neighboring buttons of the first input unit, and a control unit to perform predetermined operations depending on a combination of buttons manipulated in the first input unit and the second input unit.

In accordance with another aspect of the present invention, there is provided a method of expanding a number of input channels, the method including manipulating a predetermined button included in a first input unit, in which a first plurality of buttons, each assigned a predetermined input code value, is arranged, manipulating a predetermined button included in a second input unit, which is formed on one side of the first input unit and in which a second plurality of buttons, each assigned a predetermined input code value, is arranged, each of the second plurality of buttons being formed to be adjacent to neighboring buttons of the first input unit, and performing a predetermined operation corresponding to a combination of buttons manipulated in the first and second input units.

According to another aspect of the present invention, there is provided at least one computer readable medium storing computer readable instructions to implement methods of the present invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 4 is a diagram showing an apparatus for expanding the number of input channels according to an exemplary embodiment of the present invention;

FIG. 8 is a diagram showing the performance of a drag-out operation according to an exemplary embodiment of the present invention;

FIG. 9 is a diagram showing the assignment of input code values according to an exemplary embodiment of the present invention;

FIG. 11 is a flowchart of a method of expanding the number of input channels according to an exemplary embodiment of the present invention.

DETAILED DESCRIPTION OF THE PREFERRED EMBODIMENTS

Figure 1:
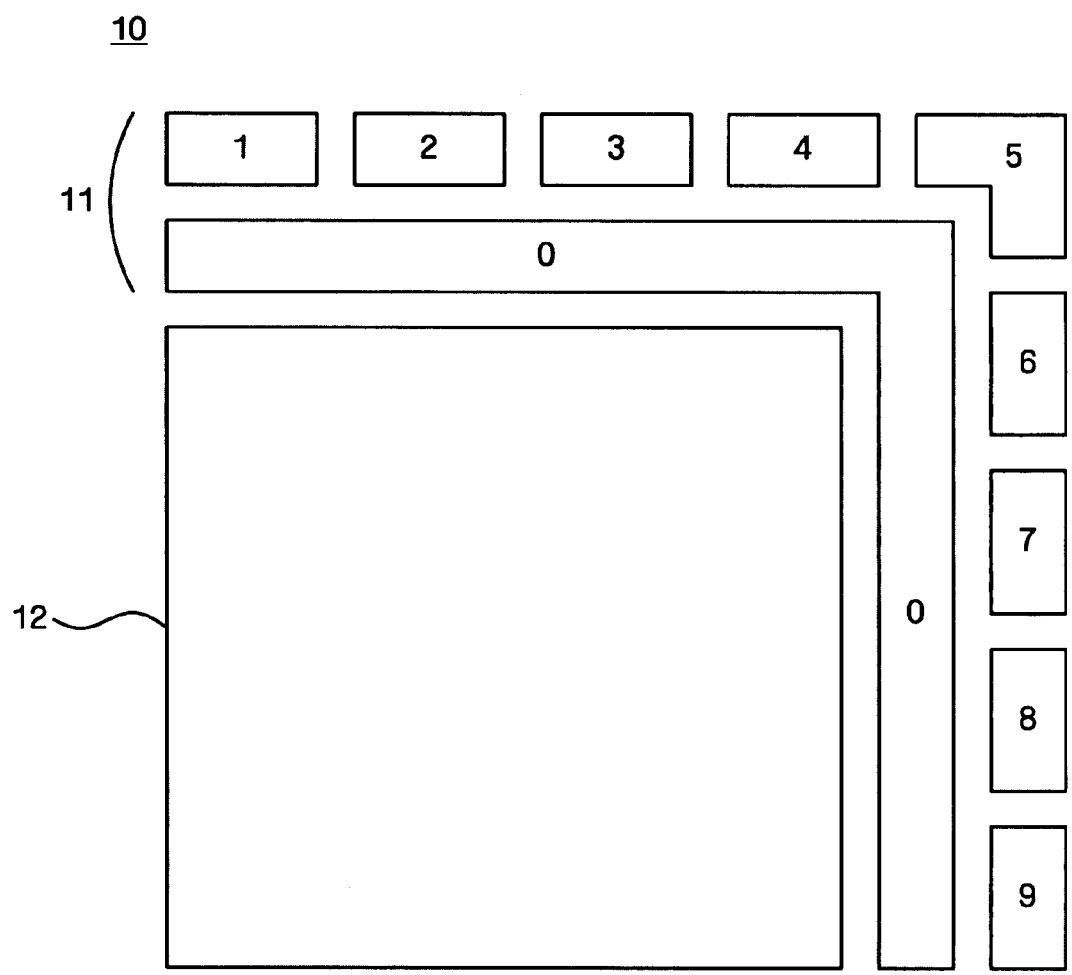
FIG. 1 is a diagram showing a conventional device having a touch pad.
Figure 2A:
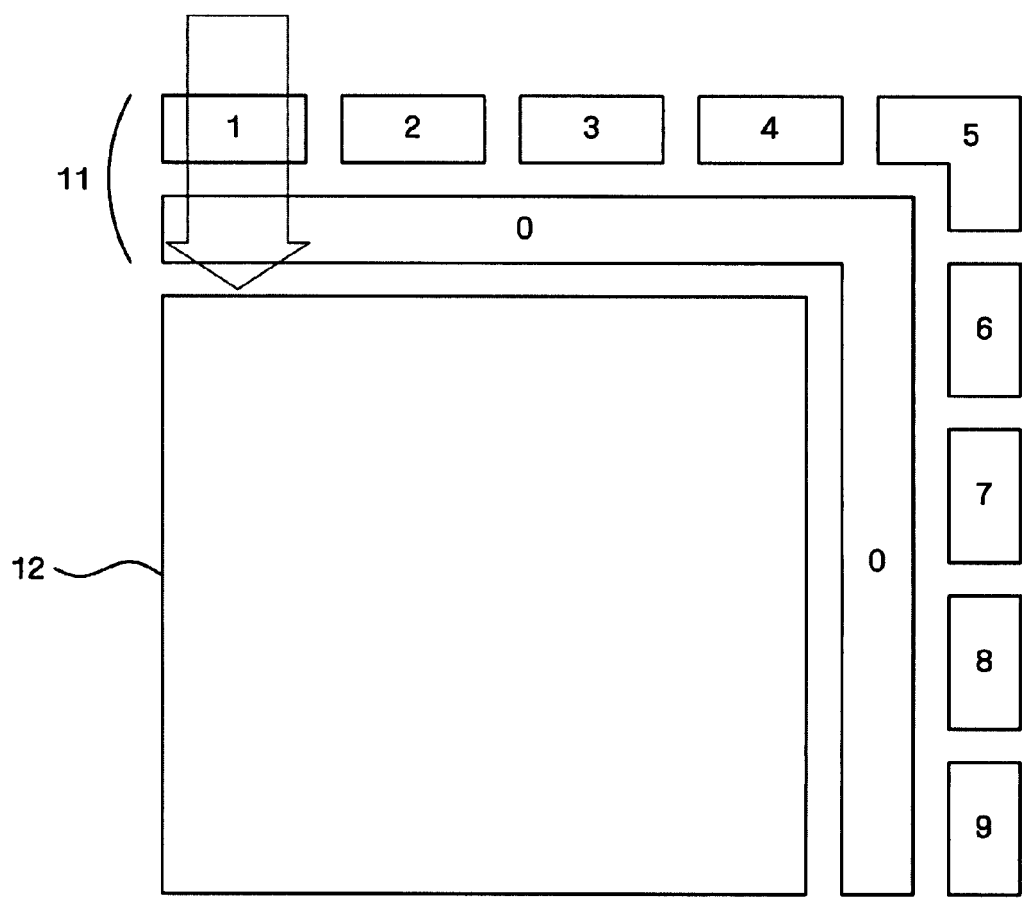
FIG. 2A is a diagram showing a drag-in operation performed using the device of FIG. 1.
Figure 2B:
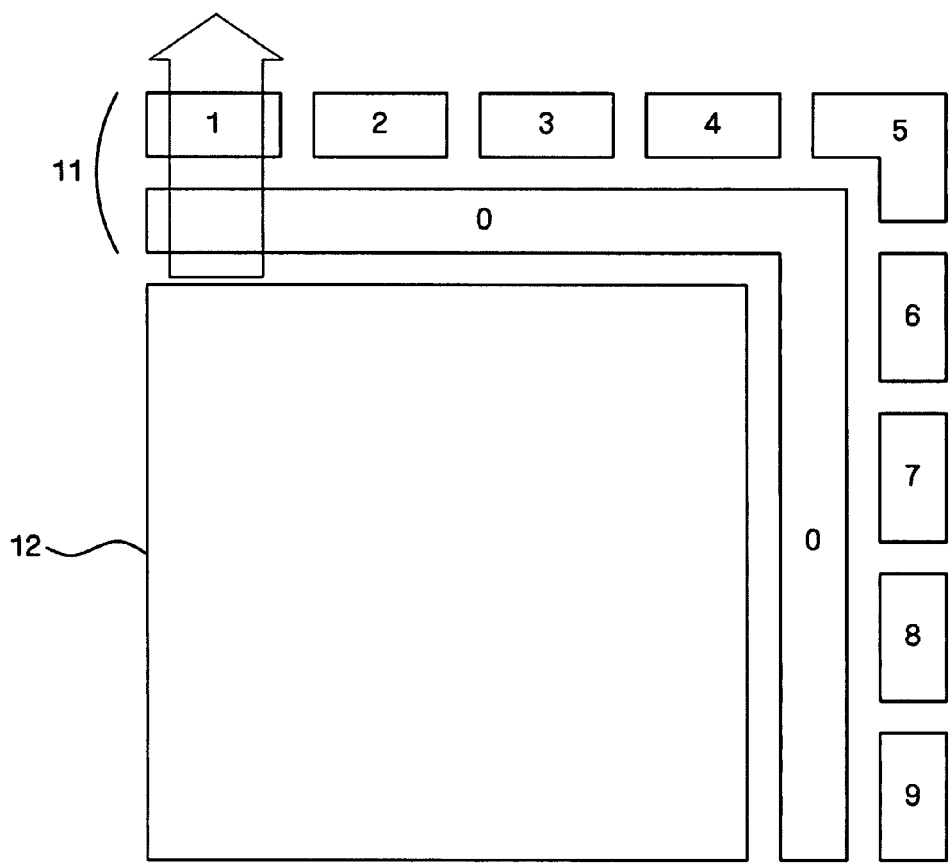
FIG. 2B is a diagram showing a drag-out operation performed using the device of FIG. 1.
Figure 3A:
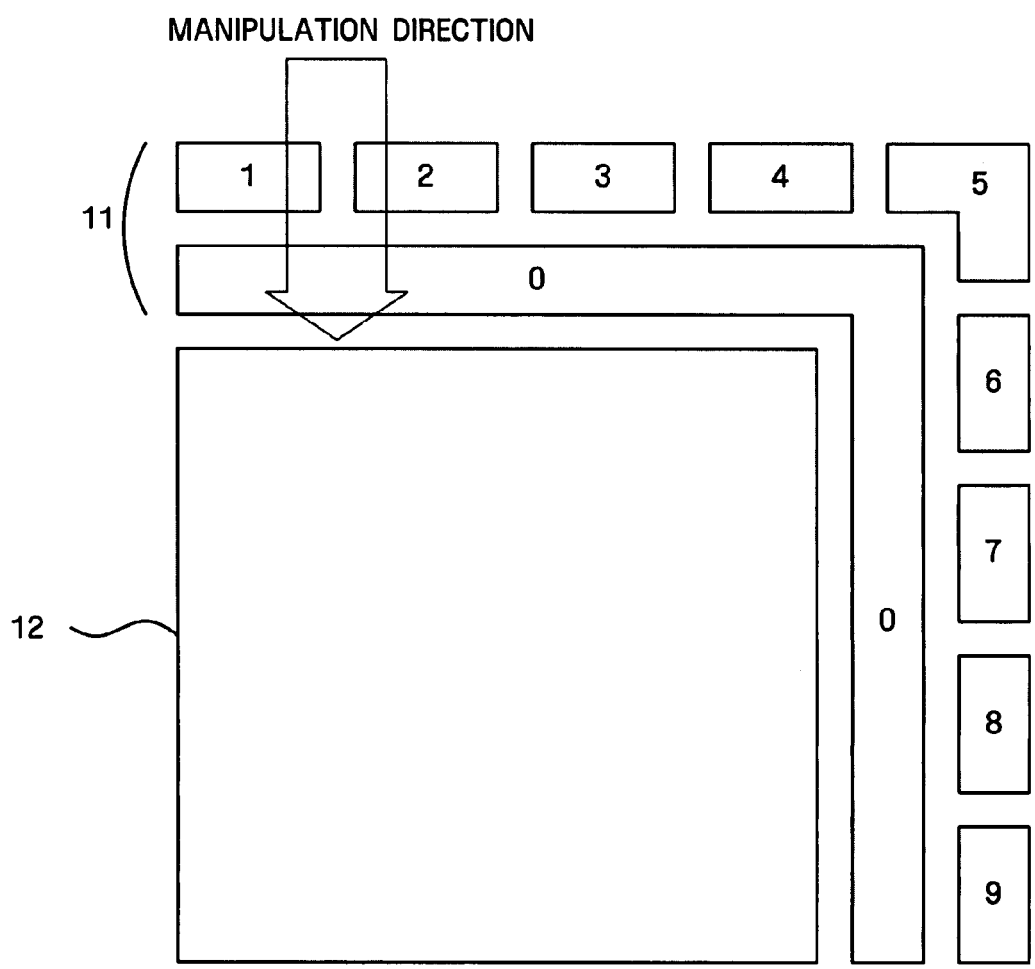
FIG. 3A is a diagram showing an erroneous drag-in operation which can occur while using the device of FIG. 1.
Figure 3B:
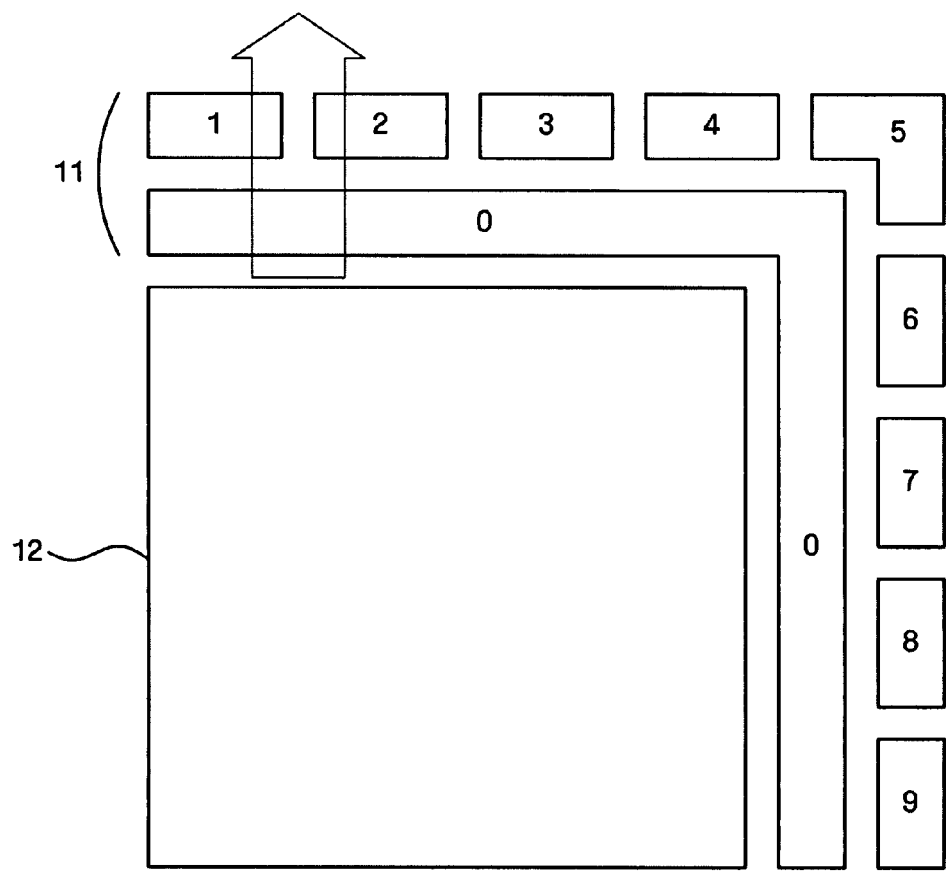
FIG. 3B is a is a diagram showing an erroneous drag-out operation which can occur while using the device of FIG. 1.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, the present invention will be described in detail with reference to the attached block diagrams or flowchart illustrations which are used to show an apparatus and method for expanding the number of input channels according to exemplary embodiments of the present invention. It will be understood that each block of the flowchart illustrations, and combinations of blocks in the flowchart illustrations, can be implemented using computer program instructions. These computer program instructions can be provided to a PDA, mobile phone, digital TV, portable media player (PMP) (e.g. MP3 player), digital camera, portable game player, home appliance, processor of a general purpose computer, processor of a special purpose computer, or other processor of a programmable data processing apparatus to produce a machine, such that the instructions, which execute on the processor of any programmable data processing apparatus to implement the functions specified in a flowchart block (or flowchart blocks).

These computer program instructions may also be stored in a computer-usable or computer-readable memory that can direct any programmable data processing apparatus to function in a particular manner, such that the instructions stored in the computer usable or computer-readable memory produce an article of manufacture to implement the function(s) (operation(s)) specified in a flowchart block (or flowchart blocks). The computer program instructions may also be loaded onto any programmable data processing apparatus to cause a series of operational steps to be performed on any programmable data processing apparatus to produce a computer implemented process such that the instructions that execute on any programmable data processing apparatus provide steps for implementing the function(s) specified in the flowchart block (or flowchart blocks).

Further, each block of a flowchart may represent a module, segment, or portion of code, which comprises one or more executable instructions for implementing the specified logical function(s). It should also be noted that, in some alternative implementations, the functions noted in the blocks may occur in a different order. For example, two blocks shown in succession may in fact be executed substantially concurrently, or the blocks may sometimes be executed in reverse order, depending upon the desired functionality.

FIG. 4 is a diagram showing an apparatus for expanding the number of input channels according to an exemplary embodiment of the present invention.

As shown in FIG. 4, an apparatus 100 for expanding the number of input channels according to an exemplary embodiment of the present invention includes a first input unit 110, a second input unit 120, a control unit 130, and a storage unit 140. In this case, the input channel number expansion apparatus 100 according to exemplary embodiment of the present invention can be understood to be an apparatus which is installed in a device, having a display module capable of displaying images or a user interface, and which is used by a user to view images or select desired menu items. Therefore, the input channel number expansion apparatus 100 of the present invention can be used in a digital TV, a Personal Digital Assistant (PDA), a mobile phone, portable media player (PMP) (e.g. MP3 player), digital camera, portable game player, home appliance, etc., provided with a display module capable of displaying images or a user interface, but is not limited to the above devices.

The first input unit 110 may include a plurality of buttons to which input code values existing within a predetermined range are assigned. In an exemplary embodiment of the present invention, the case where respective buttons included in the first input unit 110 are implemented using touch buttons is described as an example. However, the implementation of the buttons of the present invention is not limited to such an example. Further, in an exemplary embodiment of the present invention, the case where input code values exist within the range from 0 to 9 is described as an example. In this exemplary embodiment of the present invention, the case where the input code values exist within the range from 0 to 9 is described as an example, but this case is only an exemplary embodiment used for facilitating the understanding of the present invention, and the range of input code values can vary according to purpose and necessity of a user.

Figure 5:
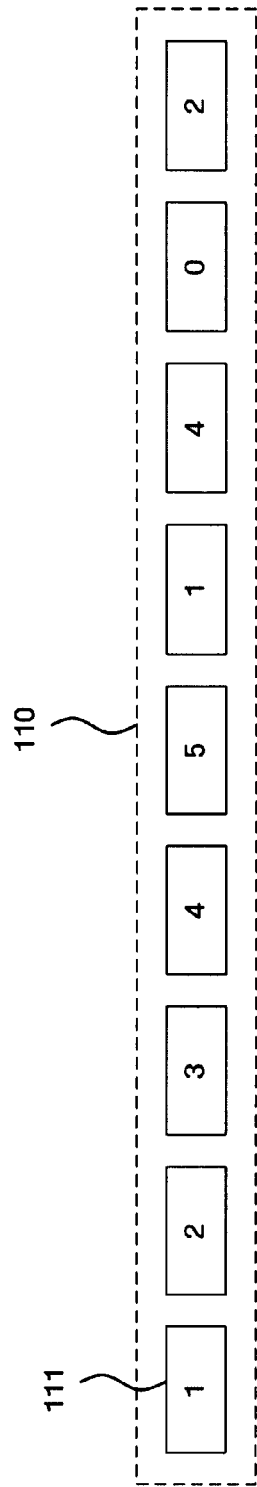
FIG. 5 is a diagram showing a first input unit according to an exemplary embodiment of the present invention.

FIG. 5 is a diagram showing a first input unit according to an exemplary embodiment of the present invention.

As shown in FIG. 5, the first input unit 110 according to an exemplary embodiment of the present invention may include a plurality of buttons 111 to which input code values, existing within the above range, are assigned. In FIG. 5, numerals marked on the buttons 111 can be understood to be input code values assigned thereto. Further, in FIG. 5, the case where the buttons 111 included in the first input unit 110 are arranged in a line is described as an example, but the present invention is not limited to this example, and the shape of the arrangement of the buttons 111 can vary according to the shape of a display module. For example, the first input unit 110 can be arranged in an "inverted and reversed L" shape or an "L" shape.

Further, input code values can be assigned to respective buttons 111 of the first input unit 110 so that each combination of input code values assigned to adjacent buttons is unique. In this case, the input code values assigned to respective buttons 111 of the first input unit 110 can be determined in consideration of the second input unit 120, which will be described later. The reason for assigning input code values in this way is described in detail with reference to the second input unit 120, which will be described later.

Figure 6:
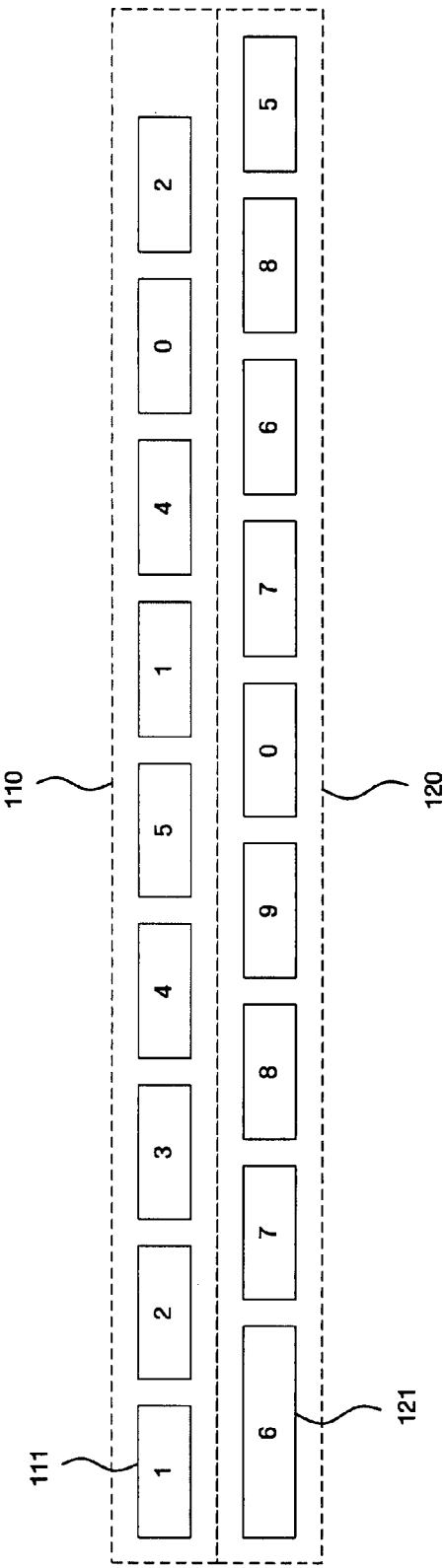
FIG. 6 is a diagram showing a first input unit and a second input unit according to an exemplary embodiment of the present invention.

FIG. 6 is a diagram showing a first input unit and a second input unit according to an exemplary embodiment of the present invention.

As shown in FIG. 6, the second input unit 120 according to an exemplary embodiment of the present invention is formed on one side of the first input unit 110, and may include a plurality of buttons 121, each arranged to abut at least two buttons included in the first input unit 110. In an exemplary embodiment of the present invention, the case where each of the buttons 121, included in the second input unit 120, is formed to abut two buttons included in the first input unit 110 is described as an example. Further, in FIG. 9, numerals marked on respective buttons 121 can be understood to be input code values assigned thereto. The buttons 121 included in the second input unit 120 also have the same range of input code values as those included in the first input unit 110.

In this case, the reason for forming each of the buttons 121, included in the second input unit 120, so as to abut the neighboring buttons of the first input unit 110 is to prevent the occurrence of an erroneous operation when the user performs a drag-in or drag-out operation.

Figure 7A:
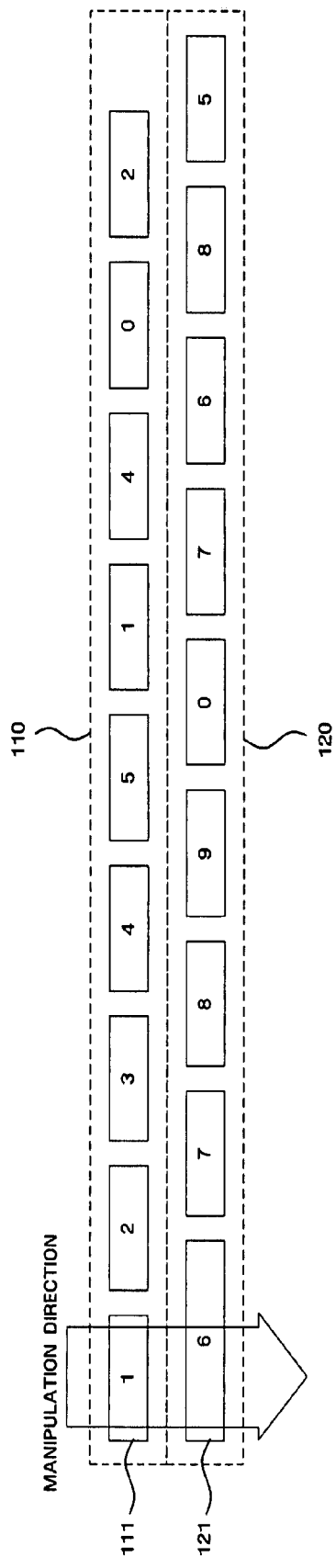
FIGS. 7A and 7B are diagrams showing the performance of a drag-in operation according to an exemplary embodiment of the present invention.
Figure 7B:
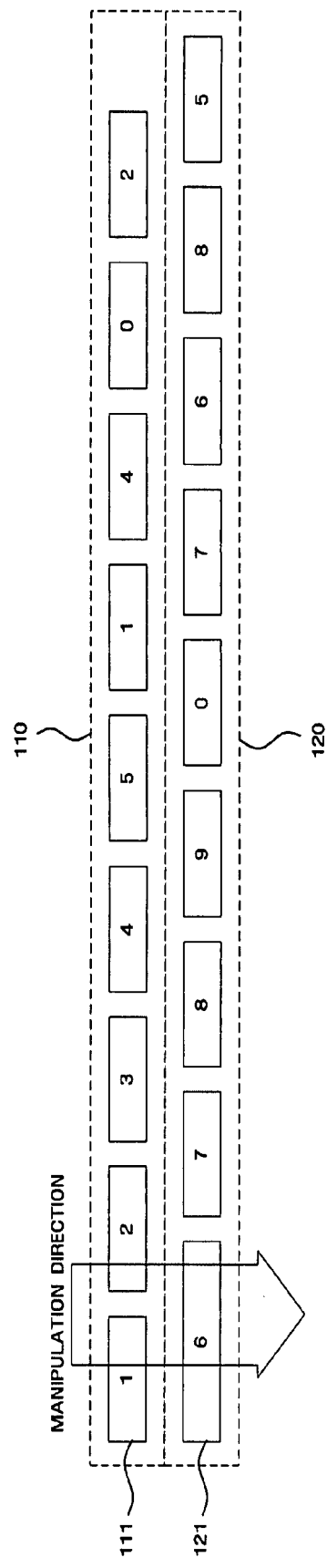

In detail, as shown in FIG. 7A, when the user performs a drag-in operation in the direction of the arrow from the first input unit 110 to the second input unit 120, only a single button need be manipulated in the first input unit 110. However, when two buttons are manipulated in the first input unit 110 due to the user's carelessness, as shown in FIG. 7B, an erroneous operation may occur. In this case, since each of the buttons 121 of the second input unit 120 is arranged to abut over two neighboring buttons included in the first input unit 110, two buttons are manipulated in the first input unit 110, whereas only a single button is manipulated in the second input unit 120.

Therefore, in the case where two buttons are simultaneously manipulated in the first input unit 110 and one button is manipulated in the second input unit 120, the control unit 130 can determine that the above case is the same as the case where any one of the two buttons is manipulated in the first input unit 110 and one button is manipulated in the second input unit 120. For example, as shown in FIG. 7B, in the case where buttons having input code values of 1 and 2 are simultaneously manipulated in the first input unit 110, and a button having an input code value of 6 is manipulated in the second input unit 120, the control unit 130 determines that the above case is the same as the case where any one of the buttons having the input code values 1 and 2 is manipulated in the first input unit 110 and the button having an input code value of 6 is manipulated in the second input unit 120, thus preventing the occurrence of an erroneous operation. Further, in the case where the button having an input code value of 1 or 2 is manipulated in the first input unit 110 and the button having an input code value of 6 is manipulated in the second input unit 120, the control unit determines that this case is the same as the above case where the buttons having input code values of 1 and 2 are simultaneously manipulated in the first input unit 110.

Further, a drag-out operation is performed similar to the above drag-in operation. In the case where a button having an input code value of 6 is manipulated in the second input unit 120 and buttons having input code values of 1 and 2 are simultaneously manipulated in the first input unit 110, as shown in FIG. 8, the control unit determines that the above case is the same as the case where the button having an input code value of 6 is manipulated in the second input unit 120 and any one of the buttons having input code values of 1 and 2 is manipulated in the first input unit 110, thus preventing the occurrence of an erroneous operation. Further, in the case where the button having an input code value of 6 is manipulated in the second input unit 120 and the button having an input code value of 1 or 2 is manipulated in the first input unit 110, the control unit determines that this case is the same as the above case where the buttons having input code values of 1 and 2 are simultaneously manipulated in the first input unit 110.

Meanwhile, the input code values assigned to respective buttons 121 included in the second input unit 120 can be appropriately assigned in consideration of the input code values assigned to the buttons 111 included in the first input unit 110.

In other words, an input code value that can be assigned to a predetermined button included in the first input unit 110 or the second input unit 120 can be set to an input code value that exists within the above range, and does not overlap the input code values assigned to the buttons of the first and second input units 110 and 120, adjacent to the predetermined button, and input code values assigned to buttons adjacent to other buttons, to which the input code values, assigned to the buttons adjacent to the predetermined button, have already been assigned.

For example, as shown in FIG. 9, when an input code value is intended to be assigned to a predetermined button 122 included in the second input unit 120, any one of input code values 3, 4, 7, and 8, other than input code values of 0 and 1, assigned to the buttons adjacent to the button 122, input code values of 5 and 9, adjacent to the input code values of 0 and 1, and input code values of 2 and 6, assigned to buttons adjacent to another button 123, to which an input code value of 0 or 1, assigned to the button adjacent to the button 122, has already been assigned, among input code values ranging from 0 to 9, can be assigned to the button 122. Accordingly, when an input code value is intended to be assigned to a predetermined button 122 included in the second input unit 120, any one of input code values 3, 4, 7, and 8 can be assigned to the button 122. However, (1) input code values of 5 and 9 which are adjacent to the input code values of 0 and 1, (2) input code values of 2 and 6 which are assigned to buttons adjacent to another button 123 having an input value of 1, and (3) input code values 0 and 1 which are assigned to the button adjacent to the button 122, can not be assigned to button 122. Through such a method, each combination of an input code value assigned to a predetermined button included in the first input unit 110 or the second input unit 120, and input code values assigned to buttons adjacent to the predetermined button may be unique. For example, the combination of input code values 1 and 2 in the first input unit 110 can be unique in each of the first input unit 110 and the second input unit 120, and a set of the first input unit 110 and the second input unit 120. The reason for this is that, when the same combinations of adjacent input code values exist among different buttons, there is a probability that implemented functions can be determined to be the same function in spite of being different functions.

Figure 10:
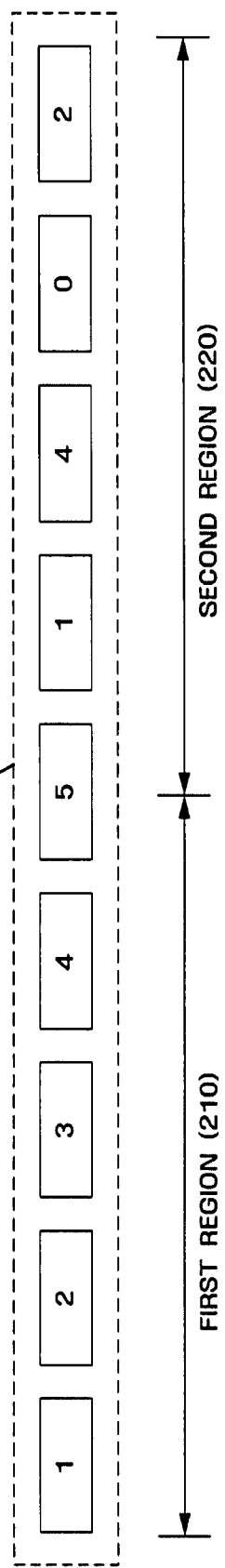
FIG. 10 is a diagram showing a first input unit divided into different functions according to an exemplary embodiment of the present invention.

For example, as shown in FIG. 10, if the first input unit 110 is divided into a first region 210 enabling the selection of menu items, and a second region 220 enabling the scroll of a selected menu item, and the combination of input code values of 3 and 4 exists both in the first region 210 and the second region 220, two functions are simultaneously performed, thus causing an erroneous operation. Therefore, the combination of input code values assigned to two adjacent buttons is formed to be unique, thereby preventing the occurrence of an erroneous operation.

The storage unit 140 can store mapping tables containing input code values, assigned to respective buttons 111 and 121 included in the first input unit 110 and the second input unit 120, and functions corresponding to input code values. Table 1 shows an example of a mapping table.

TABLE 1

|  | drag-in | drag-out |
|---|---|---|
| Image | 1 –> 6 | 6 –> 1 |
| Music | 2 –> 6, 7 | 6, 7 –> 2 |
| picture | 3 –> 7, 8 | 7, 8 –> 3 |

The mapping table of Table 1 may include functions corresponding to input code values according to a drag-in operation and a drag-out operation. For example, if input code values are 1->6, a menu item for images is displayed, whereas, if input code values are 6->1, the displayed menu item can be canceled. Further, if the input code values are 2->6, 7, a menu item for music is displayed, whereas, if input code values are 6, 7->2, the menu item for music can be canceled. In this case, it can be determined that a menu item for music is displayed even if input code values 6 and 7 are simultaneously manipulated at the time when a menu item for music is displayed, because each button 121 of the second input unit 120 is formed to abut neighboring buttons of the first input unit 110. The input code values and functions shown in Table 1 are only examples for facilitating the understanding of the present invention. The input code values and functions shown in Table 1 can vary according to purpose and necessity. The input code values of Table 1 can be understood to be input code values used for the drag-in operation and drag-out operation of FIG. 6.

As described above, input code values assigned to the first input unit 110 and the second input unit 120 can be designated during a manufacturing process, before the input channel number expansion apparatus 100 according to exemplary embodiment of the present invention or products that include the input channel number expansion apparatus 100 come onto the market. However, the designation of input code values of the present invention is not limited to the above example, and can be changed later through a firmware update, or can be altered by the user.

Further, in an exemplary embodiment of the present invention, an example in which two input units are arranged, as in the case of the first input unit 110 and the second input unit 120, is described, but this exemplary embodiment is only an example for facilitating the understanding of the present invention, and the number of input units can vary.

In other words, a separate input unit can be formed on one side of the first input unit 110 or the second input unit 120, in addition to the first and second input units 110 and 120. In this case, input code values assigned to respective buttons, included in the separate input unit, can also be assigned using a method similar to that of the first input unit 110 or the second input unit 120. For example, a desired button to be assigned a predetermined input code value in the separate input unit can be assigned any one of input code values other than input code values assigned to buttons adjacent to the desired button, input code values assigned to buttons adjacent to the buttons adjacent to the desired button, and input code values assigned to buttons adjacent to other buttons, to which the input code values, assigned to the buttons adjacent to the desired button, have already been assigned. In this way, if the number of input units increases, the combination of buttons becomes complicated, so that the number of input channels decreases, but functions corresponding to combinations of buttons can be more definitely implemented, compared to the case where only the first and second input units 110 and 120, which can be represented by input code values existing within the range from 0 to 9, are formed.

The combination of input code values assigned to adjacent buttons is formed to be unique in this way, and thus the number of input channels to be implemented using input code values existing within the range from 0 to 9, which is a limited range, can be expanded. Accordingly, 10 input channels can be implemented through a chipset supporting input code values from 0 to 9, whereas the input channel number expansion apparatus 100 according to an exemplary embodiment of the present invention can use more input channels even when the same number of chipsets is used, so that the number of chipsets used can be reduced.

FIG. 11 is a flowchart of a method of expanding the number of input channels according to an exemplary embodiment of the present invention. In this case, the case where the assignment of input code values is primarily performed on the buttons 111 of the first input unit 110, and is secondarily performed on the buttons 121 of the second input unit 120, is described as an example. In this case, the structure of primarily assigning the input code values to the buttons 111 of the first input unit 110 is only an example used for facilitating the understanding of the present invention, and the sequence of the assignment of input code values can vary.

As shown in FIG. 11, the input channel number expansion method according to an exemplary embodiment of the present invention determines input code values that are assigned to buttons adjacent to a desired button to be assigned a predetermined input code value in the first input unit 110 or the second input unit 120 at step S10. An input code value that can be assigned to a desired button in the first input unit 110 or the second input unit 120 in an exemplary embodiment of the present invention is described using the case where the input code values exist within the range from 0 to 9, as an example, as described above, and the range of the input code values can vary.

If the input code values assigned to the buttons adjacent to the desired button are determined, input code values, assigned to buttons adjacent to the buttons adjacent to the desired button, are determined at step S120.

If input code values, assigned to the buttons adjacent to the buttons adjacent to the desired button, are determined, input code values assigned to buttons adjacent to other buttons, which have already been assigned the same input code values as those assigned to the buttons adjacent to the desired button, are determined at step S130.

Any one of the input code values, other than the input code values determined at steps S110 to S130, within the range of input code values, is assigned to the desired button, obtained at step S110, at step S140. For example, any one of input code values of 8 and 9, other than input code values of 0, 1, 2, 3, 4, 5, 6 and 7, within the range from 0 to 9, can be assigned to the desired button, when the input code values exist within the range from 0 to 9, input code values of 0, 1 and 2 are assigned to buttons adjacent to the desired button, input code values of 2, 3 and 4 are assigned to buttons adjacent to the buttons, which are assigned the input code values of 0, 1 and 2, and input code values of 5, 6 and 7 are assigned to buttons adjacent to other buttons to which the input code values of 0, 1 and 2 are assigned.

In this way, the reason for assigning an input code value, other than input code values assigned to buttons adjacent to a desired button to be assigned an input code value, and input code values assigned to buttons that are adjacent to other buttons assigned the input code values, which have already bean assigned to the buttons adjacent to the desired button, is to cause the combination of input code values assigned to adjacent buttons in each of the first input unit 110 and the second input unit 120, and a set of the first and second input units 110 and 120, to be unique, and to cause the number of input channels corresponding to the input code values existing within the range from 0 to 9 to be greater than 10, which is the number of conventional input channels, thus enabling the implementation of more input channels while utilizing the same input code values as the conventional method.

Further, in the input channel number expansion apparatus 100 according to an exemplary embodiment of the present invention, each of the buttons of the second input unit 120 is formed to abut neighboring buttons of the first input unit 110. If a single button of the second input unit 120, formed to abut neighboring buttons of the first input unit 110, is manipulated even if neighboring buttons are simultaneously manipulated in the first input unit 110, the occurrence of an erroneous operation can be prevented.

In addition to the above-described exemplary embodiments, exemplary embodiments of the present invention can also be implemented by executing computer readable code/instructions in/on a medium/media, e.g., a computer readable medium/media. The medium/media can correspond to any medium/media permitting the storing and/or transmission of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter. In addition, code/instructions may include functional programs and code segments.

The computer readable code/instructions can be recorded/transferred in/on a medium/media in a variety of ways, with examples of the medium/media including magnetic storage media (e.g., floppy disks, hard disks, magnetic tapes, etc.), optical media (e.g., CD-ROMs, DVDs, etc.), magneto-optical media (e.g., floptical disks), and hardware storage devices (e.g., read only memory media, random access memory media, flash memories, etc.). The medium/media may also be a distributed network, so that the computer readable code/instructions are stored/transferred and executed in a distributed fashion. The computer readable code/instructions may be executed by one or more processors. The computer readable code/instructions may also be executed and/or embodied in at least one application specific integrated circuit (ASIC) or Field Programmable Gate Array (FPGA).

In addition, one or more software modules or one or more hardware modules may be configured in order to perform the operations of the above-described exemplary embodiments.

The term "module", as used herein, denotes, but is not limited to, a software component, a hardware component, a plurality of software components, a plurality of hardware components, a combination of a software component and a hardware component, a combination of a plurality of software components and a hardware component, a combination of a software component and a plurality of hardware components, or a combination of a plurality of software components and a plurality of hardware components, which performs certain tasks. A module may advantageously be configured to reside on the addressable storage medium/media and configured to execute on one or more processors. Thus, a module may include, by way of example, components, such as software components, application specific software component, object-oriented software components, class components and task components, processes, functions, operations, execution threads, attributes, procedures, subroutines, segments of program code, drivers, firmware, microcode, circuitry, data, databases, data structures, tables, arrays, and variables. The functionality provided for in the components or modules may be combined into fewer components or modules or may be further separated into additional components or modules. Further, the components or modules can operate at least one processor (e.g. central processing unit (CPU)) provided in a device. In addition, examples of a hardware components include an application specific integrated circuit (ASIC) and Field Programmable Gate Array (FPGA). As indicated above, a module can also denote a combination of a software component(s) and a hardware component(s). These hardware components may also be one or more processors.

The computer readable code/instructions and computer readable medium/media may be those specially designed and constructed for the purposes of the present invention, or they may be of the kind well-known and available to those skilled in the art of computer hardware and/or computer software.

As described above, the present invention provides an apparatus, method, and medium for expanding the number of input channels, which have the following one or more advantages.

First, the number of input channels that can be implemented through a limited number of input code values can be increased, thus performing various functions.

Second, an erroneous operation, occurring when neighboring buttons in a first input unit are simultaneously manipulated due to a user's carelessness, can be prevented through each button of a second input unit formed to abut neighboring buttons of the first input unit.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. An apparatus for expanding a number of input channels, the apparatus comprising:
    a first input unit which includes a first plurality of buttons arranged therein, each of the first plurality of buttons being assigned a predetermined input code value;
    a second input unit which is formed on one side of the first input unit and which includes a second plurality of buttons arranged therein, each of the second plurality of buttons being assigned predetermined input code value and each being formed to be adjacent to neighboring buttons of the first input unit; and
    a control unit to perform predetermined operations depending on a combination of buttons manipulated in the first input unit and the second input unit,
    wherein each of the buttons included in each of the first and second input units is assigned an input code value existing within a predetermined range.

2. The input channel number expansion apparatus of claim 1, wherein the input code value assigned to each of the buttons included in each of the first and second input units does not overlap input code values assigned to buttons adjacent to a predetermined button, input code values assigned to buttons adjacent to the buttons adjacent to the predetermined button, and input code values assigned to buttons adjacent to other buttons, to which the input code values, assigned to the buttons adjacent to the predetermined button, have already been assigned.

3. The input channel number expansion apparatus of claim 2, wherein the adjacent buttons are buttons which are arranged near the predetermined button included in the first or second input unit and which are included in the first or second input unit.

4. The input channel number expansion apparatus of claim 1, wherein the control unit performs an operation corresponding to a combination of buttons manipulated in a sequence of the first input unit and the second input unit.

5. The input channel number expansion apparatus of claim 1, wherein the control unit performs an operation corresponding to a combination of buttons manipulated in a sequence of the second input unit and the first input unit.

6. The input channel number expansion apparatus of claim 1, wherein the control unit performs an operation corresponding to a combination of simultaneously manipulated buttons in the first and second input units.

7. A method of expanding a number of input channels, the method comprising:
    manipulating a predetermined button included in a first input unit, in which a first plurality of buttons, each assigned a predetermined input code value, is arranged;
    manipulating a predetermined button included in a second input unit, which is formed on one side of the first input unit and in which a second plurality of buttons, each assigned a predetermined input code value, is arranged, each of the second plurality of buttons being formed to be adjacent to neighboring buttons of the first input unit; and
    performing a predetermined operation corresponding to a combination of buttons manipulated in the first and second input units,
    wherein each of the buttons included in each of the first and second input units is assigned an input code value existing within a predetermined range.

8. The input channel number expansion method of claim 7, wherein the input code value assigned to each of the buttons included in each of the first and second input units does not overlap input code values assigned to buttons adjacent to a predetermined button, input code values assigned to buttons adjacent to the buttons adjacent to the predetermined button, and input code values assigned to buttons adjacent to other buttons, to which the input code values, assigned to the buttons adjacent to the predetermined button, have already been assigned.

9. The input channel number expansion method of claim 8, wherein the adjacent buttons are buttons which are arranged near the predetermined button included in the first or second input unit and which are included in the first or second input unit.

10. The input channel number expansion method of claim 7, wherein the performing the predetermined operation comprises performing a function corresponding to a combination of buttons manipulated in a sequence of the first input unit and the second input unit.

11. The input channel number expansion method of claim 7, wherein the performing the predetermined operation comprises performing a function corresponding to a combination of buttons manipulated in a sequence of the second input unit and the first input unit.

12. The input channel number expansion method of claim 7, wherein the performing the predetermined operation comprises performing an operation corresponding to a combination of simultaneously manipulated buttons in the first and second input units.

13. At least one computer readable medium storing instructions that control at least one processor to implement the method of claim 7.

* * * * *